(12) United States Patent
Perfilev et al.

(10) Patent No.: US 10,497,180 B1
(45) Date of Patent: Dec. 3, 2019

(54) SYSTEM AND METHOD FOR DISPLAY OF AUGMENTED REALITY

(71) Applicant: OOO "AI-EKSP", Moscow (RU)

(72) Inventors: Denis Perfilev, Lipetsk (RU); Pavel Samsonov, Reutov (RU)

(73) Assignee: OOO "AI-EKSP", Moscow (RU)

( * ) Notice: Subject to any disclaimer, the term of this patent is extended or adjusted under 35 U.S.C. 154(b) by 6 days.

(21) Appl. No.: 16/026,908

(22) Filed: Jul. 3, 2018

(51) Int. Cl.
| | |
|---|---|
| *G06F 19/00* | (2018.01) |
| *G06T 19/00* | (2011.01) |
| *G06T 7/73* | (2017.01) |
| *H04W 4/02* | (2018.01) |
| *H04N 19/39* | (2014.01) |
| *G06T 9/00* | (2006.01) |

(52) U.S. Cl.
CPC .............. *G06T 19/006* (2013.01); *G06T 7/74* (2017.01); *G06T 9/001* (2013.01); *G06T 19/003* (2013.01); *H04N 19/39* (2014.11); *H04W 4/026* (2013.01); *G06T 2210/62* (2013.01); *G06T 2219/2008* (2013.01)

(58) Field of Classification Search
None
See application file for complete search history.

(56) References Cited

U.S. PATENT DOCUMENTS

| | | | |
|---|---|---|---|
| 2005/0104966 A1* | 5/2005 | Schoelkopf ........... | G06T 11/001 348/207.11 |
| 2007/0153091 A1* | 7/2007 | Watlington .............. | H04N 7/15 348/208.14 |
| 2010/0257252 A1 | 10/2010 | Dougherty et al. | |

\* cited by examiner

*Primary Examiner* — Michelle Chin
(74) *Attorney, Agent, or Firm* — Bardmesser Law Group

(57) ABSTRACT

Method of displaying augmented reality, including initializing the user device, launching a utility for determining device coordinates and device orientation; transmitting, to a server, user device parameters, the device coordinates and the device orientation; омен codec information for encoding received data; transmitting zero coordinates to server; continuously sending updated device coordinates and updated device orientation to the server; on server, inserting virtual objects into a virtual scene, using the zero coordinates and the updated device coordinates and orientation. Virtual camera duplicates movements of camera of the user device, and renders an image including inserted virtual objects on transparent background; encoding and transmitting the encoded image to the user device; continuing to transmit encoded images based on updated virtual objects, updated coordinates and orientation, as a video stream. On the user device, decoding the video stream; overlaying it onto camera images to generate a combined video; and displaying the combined video.

18 Claims, 8 Drawing Sheets

SYSTEM AND METHOD FOR DISPLAY OF AUGMENTED REALITY

BACKGROUND OF THE INVENTION

Field of the Invention

The present technology is a client-server application for displaying augmented reality scenes for several users at once, so that they could watch those scenes collectively, in high quality, using mobile phone or tablet screens, as well as large presentation screens.

Description of the Related Art

Rendering of augmented reality images requires high-performance systems. Currently, the quality threshold of AR-based technologies is capped by low performance of displaying devices, such as VR/AR goggles, phones, or tablets, specifically, their weak CPUs and small amounts of RAM. In order to display AR images correctly on mobile devices, 3D objects and GFX are greatly optimized, which further deteriorates the graphics quality.

The main objective of the present technology is to transfer the most resource-incentive operation—3D scene rendering—to the server and broadcast a high-quality video stream to mobile device using the video streaming technology, so that high-quality image could be obtained even on low-performance devices. Streaming transmission methods are now widely used, but the proposed technology allows to stream AR-enabled video to different devices (mobile devices, displays and PCs) and platforms (Android, IOS, Windows Phone), which is a novel approach. It is also characterized by the fact that the video stream and its transparency mask have to be broadcast simultaneously.

For instance, the user wishes to put a virtual 3D object on a table, so that it was displayed in the middle of the table and didn't change its relative location whatever the camera position or angle were, to create an impression that it is actually located on the table. This process consists of several steps. First, the client application (on a device) acquires the coordinates of the device itself and the bearings of its camera relative to the table. Then, this data is sent to the server over the network, which undertakes the most complex calculations related to the displaying of the virtual 3D object. Upon receiving the data, the server first determines the angle and the size of the 3D object to be rendered. Then, the object is rendered to generate an image with transparent background. This resulting image is then sent back to the device. Then, the device camera feed is overlaid with the received image of the 3D object, and, since the object has been rendered based on the camera position, angle and perspective, it would seem as if the object is actually located on the table. Thanks to the fast video stream encoding and compression technology, delays in data transmission and receiving would be minimal, so that the user would have an impression that the entire image is being rendered in real time on their phone.

Another problem is collective viewing of AR images, wherein several devices view the same AR objects in the scene at once. It is necessary for them to know their positions relative to each other to coordinate rendering of virtual objects, so that all devices could view the same scene—the process called synchronization. For instance, in Hololens, AR-goggles by Microsoft, this problem has been solved by assigning the Master Device role to one device, while other devices (slaves) connect to it, so that all data transmissions and synchronizations are performed through that device. However, since the device itself demonstrates performance that is inferior to that of PC, it faces difficulties when synchronizing a large number of devices, which in turn results in data processing delays and causes discomfort when viewing AR images.

Accordingly, there is a need in the art for a different approach, where synchronization is performed on an external high-performance server, which allows to maintain comfortable viewing even for a large number of devices.

SUMMARY OF THE INVENTION

The invention relates to a method and system for rendering of augmented reality images that substantially obviates one or more of the disadvantages of the related art.

In one aspect, there is provided a method of displaying augmented reality on a user device, including initializing the user device, including launching a utility for determining device coordinates and device orientation; connecting to a server over a network; transmitting, to the server, user device parameters, the device coordinates and the device orientation; requesting from the server, or transmitting to the server, codec information for encoding received data from the server; transmitting, to the server, values of zero coordinates; continuously sending updated device coordinates and updated device orientation to the server; on the server, inserting virtual objects into a virtual scene that is maintained by the server, wherein the inserting uses the values of the zero coordinates and the updated device coordinates and updated device orientation. The virtual scene includes a virtual camera that duplicates all movements of the camera of the user device. On the server, the virtual camera renders an image that includes the inserted virtual objects on a transparent background; encoding the image on the server; transmitting the encoded image to the user device; continuing the transmit encoded images based on updated virtual objects, the updated device coordinates and updated device orientation, as a video stream. On the user device, decoding the video stream; overlaying the video stream onto images generated by the camera of the user device to generate a combined video; and displaying the combined video on the user device.

Optionally, the user device parameters include screen resolution, operating system and data transmission protocol. Optionally, the device coordinates, orientation and scale include a 4×4 matrix transform. Optionally, the zero coordinates are determined by aiming a camera of the user device at a marker. Optionally, the zero coordinates are determined by selecting any point on the display that shows an image from the camera of the user device. Optionally, the encoding of the image on the server encodes the image as an alpha channel. Optionally, the encoding includes encoding of rendered objects as a first channel, and encoding of a transparency mask as a second channel. Optionally, the encoding includes encoding of rendered objects encoding of a transparency mask into a single channel, using a codec that supports an alpha channel.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The proposed technology includes a high-performance server that renders scenes for all clients that are connected to it; client devices, such as mobile phones, tablets, and goggles, that connect to the server over the net and transmit their 3D position and rotation coordinates (in triples), screen resolution, and other auxiliary data (OS version, data transmission protocol, bandwidth and speed, scene scaling), so that the server can generate video stream that is customized to a specific device. In the discussion below, a smartphone is used as an example of a client device, although it is understood that the concept applies equally well to other types of devices, e.g., tablets, laptops, goggles, etc.

Having received said data, the server renders the scene from the corresponding angle. Then, the resulting frames are encoded and compressed to decrease the amount of data, and finally transmitted back to the devices.

Upon receiving this video stream, the client device overlays its camera feed with the images acquired from the server, which results in the augmented reality (AR) image.

For instance, to let the user see a virtual cupboard in the corner of the room on their phone camera, the following procedure is used. First, the device connects to the high-performance server doing 3D rendering. The device sends its current coordinates, camera bearings, complete with screen resolution to the server. Having received this data, the server uses them to render a virtual object (a cupboard) to generate an image with transparent background. Then, the resulting image is compressed (to decrease the amount of data to be transmitted over the net) by the proposed codec and sent back to the device. Finally, the device overlays its camera feed with the received image, so that the user sees the given virtual object as if it was actually located in the room.

Figure 1:
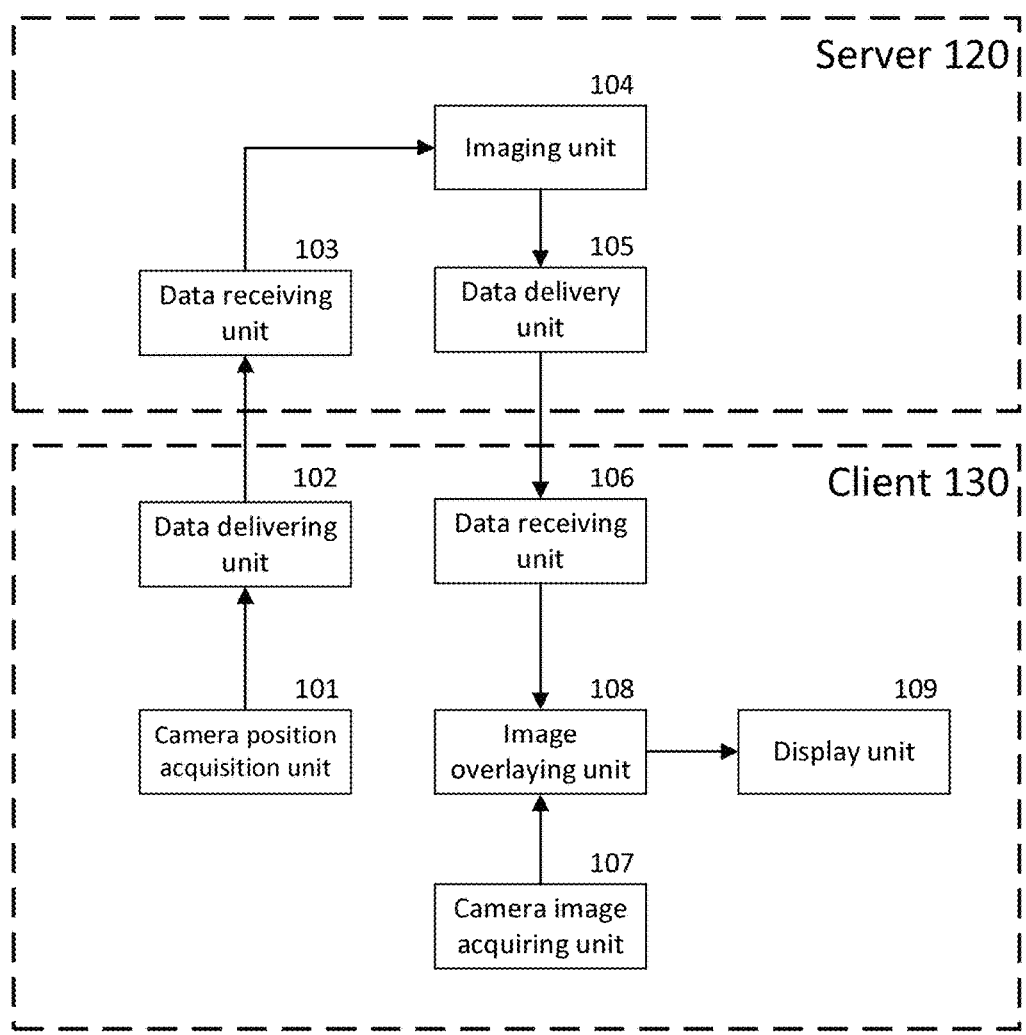
FIG. 1 illustrates an operational block diagram according to the present invention.

The present approach is based on a client-server application architecture, which includes one (or more) server and a certain number of clients that may be limited by network parameters, particularly network bandwidth. FIG. 1 illustrates an operational block diagram/system architecture according to the present invention. The server 120 is designed to render AR-images according to the client's device requirements and includes the following components:

1. Data receiving unit 103
2. Imaging Unit 104
3. Data delivery unit 105.

The server 120 is initialized as follows:
1. Initializing the 3D scene.
2. Launching the network discovery procedure and waiting for phone connection.
3. Connecting to the video server to send video to remote clients.

After a smartphone connection has been established, the server 120 opens the channel for sending images to the phone as a video stream. All control interactions, such as single or double screen taps, presses, swipes, etc. from the phone, are processed in the 3D scene.

The server supports the following transmission channels at the same time:
1. A network discovery procedure channel;
2. A channel for sending the resulting image to the phone (TCP or UDP connection, depending on broadcast quality/speed/stability requirements);

A channel for transmitting images to the video server (see FIG. 8) is used to send video to remote clients.

The data receiving unit 103 functions as follows. After startup, the server 120 begins waiting for initialization (connection) of new devices, and then coordinates are passed from the client 130 to the server 120. The initialization procedure is as follows:

Initialization initiator: client
Transmission protocol: TCP
Main data: client's screen resolution, OS version, scene scaling.
Optional parameters: may be expanded or adjusted for different applications. Examples of possible auxiliary data:

| | |
|---|---|
| "protocol": | Video stream transmission protocol settings |
| "udp", | for the data delivery unit (105) |
| "scene_scale": | Scene scaling selection |
| 0.5, | |
| "heartbeat": | Connection break check on/off |
| "yes", | |
| "scenerotation": | Scene rotation |
| "position": "yes", | Scene position |
| "projection": | Scene projection |
| "no", | |
| "platform": "ios", | Client platform |
| "app_build": | Build version |
| 1090, | |
| "os version": | Client OS version |
| "11.2", | |
| "ntp_server": | Timestamp |
| "time.google.com", | |
| "mode": "right", | Alpha channel compositing type |
| "resolution": | Screen resolution |
| {"width": 1280, | |
| "height": 720} | |

For coordinate transmission, the transmission protocol is preferably TCP. The data format is usually a float array (device position coordinates and rotation angles acquired from the AR framework). A sample array looks along the following lines: [0.2, 0.3, 0.0, 45.0, 0.0, −75.0].

The Imaging Unit 104 functions as follows. After initialization in position 3, the main parameters are passed to position 4, where a virtual camera is created for the virtual scene, with the parameters acquired during initialization. Then, the server starts rendering virtual objects that are visible to the device based on its spatial coordinates and camera bearing, as acquired from the client device. The virtual camera makes necessary perspective adjustments, so that the virtual image overlays the real-world image from the correct perspective and angle, so as to give the user an impression that the object is actually present in the real world.

The rendering process results in images (frames) that are represented by data arrays in the RGBA format, i.e., 2D images (textures). Then, the alpha-channel mask is separated from the image by means of the shader (a program executed by the GPU, such as an NVIDIA GPU) and added to the image either on the left or below it, depending on the selected mode. This allows to increase the encoding speed, as the proposed encoding algorithm (codec) will encode 3-channel textures (RGB) much faster than those containing an alpha channel. The fourth channel (alpha channel) determines the pixel transparency (0 means that the pixel is fully transparent; 255 means that the pixel is fully opaque). The image contains color data for each pixel in RGBA format (red, green, blue, alpha/transparency). Since the proposed codec operates with three color channels only, the alpha channel is removed and glued to the image according to the selected mode. As another option, the videostream can be encoded together with the alpha channel if using specialized codecs that support the alpha channel.

The resulting texture is passed to the encoder for further processing and encoding into a video stream.

At the server's startup, the encoder initializes NVIDIA (or similar) Video Codes (it maintains a high encoding speed thanks to using the GPU for encoding) and switches it into the waiting mode until the next frame from the camera is received to be encoded. After another frame has been rendered on the current camera, the plugin triggers the event instructing the codec to add the current frame to the video stream. When added, the frames are converted into the special video format, such as VP8, VP9, .h264 or similar, that allows to decrease the amount of data to be transmitted over the network. The drawback of h264 is that this format does not support texture transparency, i.e., the alpha channel, therefore the alpha channel data is transmitted as a part of a combined frame (the alpha channel mask is glued to the left or below the basic texture). There are codecs that support compression with the alpha channel, such as VP8 or VP9, that can be used.

The data delivery unit 105 functions as follows. After a frame has been added to the video stream, the resulting byte array is sent to the client device 130 over the protocol set during initialization. For instance, the UPD protocol can be used (it is designed for transmitting large amounts of data, providing good speed, as it does not guarantee successful delivery of data, but since the video stream is transmitted at the rate of 60 fps, the loss of some frames will go unnoticed by the user. Therefore this protocol is well suited for the video format). Also, there is provided a debugging mode, wherein the video stream is saved into a file. After that, the codec switches to the waiting mode, until the next frame is received from the camera.

The camera position acquiring unit 101 functions as follows. After startup, the client begins acquiring global coordinates from standard AR-viewing components in the device's OS. Then, the coordinates are sent to the server 120.

The data delivery unit 102 functions as follows. At startup, the client 130 initializes its connection to the server. After initialization, the coordinates are passed from the client 130 to the server 120 in cycles. The initialization is as follows:
Initialization initiator: client
Transmission protocol: TCP
Main data: client's screen resolution, OS version, scene scaling.

Optional parameters: may be expanded or adjusted for different applications. Examples of possible auxiliary data:

| | |
|---|---|
| "protocol": | Video stream transmission protocol for |
| "udp", | the data delivery unit (105) |
| "scene_scale": | Scene scaling |
| 0.5, | |
| "heartbeat": | Connection break check on/off |
| "yes", | |
| "scenerotation": | Scene rotation |
| "yes", | |
| "position": "yes", | Scene position |
| "projection": | Scene projection |
| "no", | |
| "platform": "ios", | Client platform |
| "app_build": | Build version |
| 1090, | |
| "os_version": | Client OS version |
| "11.2", | |
| "ntp_server": | Timestamp |
| "time.google.com", | |
| "mode": "right", | Alpha channel compositing type |
| "resolution": | Screen resolution |
| {"width": 1280, | |
| "height": 720} | |

Coordinate transmission preferably uses TCP as the protocol. The data format is a float array (device position coordinates and rotation angles acquired from the AR framework). A sample array is: [0.2, 0.3, 0.0, 45.0, 0.0, −75.0].

The data receiving unit 106 functions as follows. Having sent the coordinates and auxiliary data to the server, the client begins waiting for the rendered image of the virtual scene from the server.

The following transmission protocol is used: encoded NAL blocks over the UDP channel, i.e. the video stream is split into several data chunks to be transmitted over the network one by one. The UDP protocol is designed for transmitting large amounts of data, providing good speed, so that it is best-suited for the video format according to the present solution. Other protocols are also supported, and the optimum protocol is selected, depending on the actual device in use.

The following data format is used: a combined frame made up of a basic RGB image and a grayscale alpha-channel mask is transmitted in the codec container.

The camera image acquisition unit 107 functions as follows. Real-world images are acquired from the mobile phone camera.

The Image overlaying unit 108 functions as follows. The image (frame) overlays the mobile device camera feed by means of a shader that gets a combined image on the input, copies pixels from the alpha channel onto the basic texture, and then outputs an RGBA image. Since this program is executed by the GPU, the image decoding time is considerably shortened.

The display unit 109 renders the resulting image on the user's screen.

Figure 2:
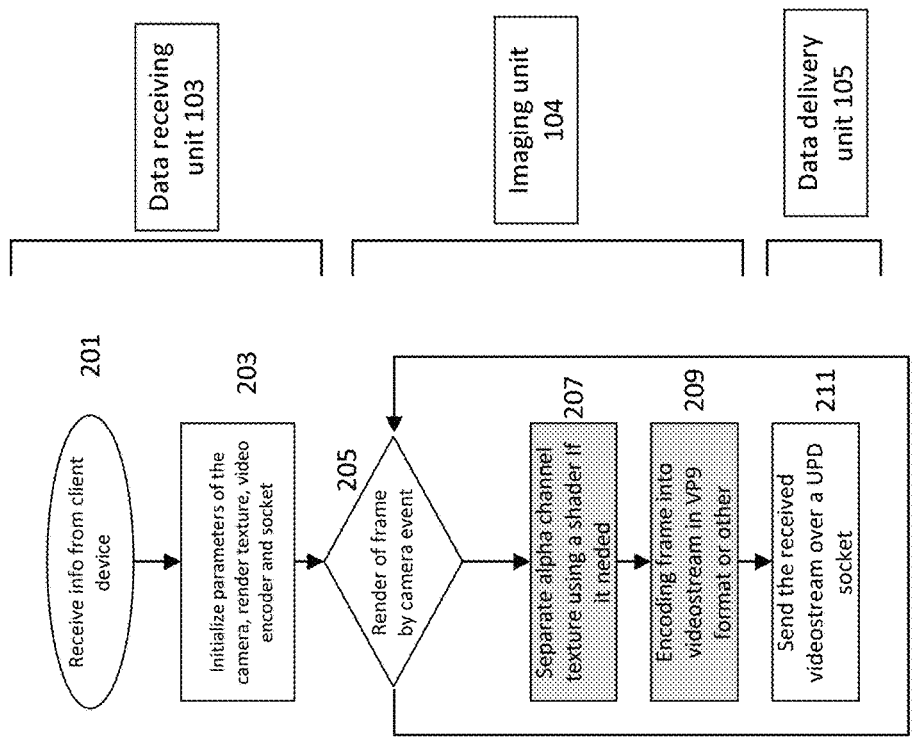
FIG. 2 illustrates the server algorithm.

FIG. 2 illustrates the server algorithm. In step 201. The server receives the data from the client that are needed to initialize the encoding session, the data including:
data transmission protocol;
scene scaling for matching the real-world coordinate space with AR 3D objects;
client device OS;
client device OS version;
client application version;
ntp-server address for synchronization between the client and server;

alpha-channel compositing mode, i.e. whether the alpha channel mask is located in the right or bottom half of the frame);

client device screen resolution, in which the client will receive the video stream from the server.

The data is preferably transmitted in JSON format.

In step 203, the plugin initialization comprises the following steps:

creating a new camera to render 3D objects in the scene;

creating a temporary texture (RenderTexture) for 3D objects to be rendered into;

initializing an instance of the video stream encoder (NVEncoder) that will encode and compress the camera feed;

initializing a socket that is needed to stream video to the client device.

In step 205, the event of rendering a frame by the camera is called 30 times per second. At each call, the camera renders the current frame into the texture (RenderTexture).

In step 207, depending on the selected mode, the alpha channel is superimposed onto RGB channels either in the right or bottom part of the image by means of a graphic software (shader) that is executed on the GPU. In step 209, the resulting image is encoded into the video stream format (e.g., *.h264) by means of the videostream encoder (NVEncoder). In step 211, the resulting video stream is presented in the form of a byte array that is divided into several parts of fixed size and then sent to the client device in separate packets (datagrams) over a net protocol (e.g., UDP) for maximum transmission speed. The array is divided into packets so that they could be more reliably delivered to the client device while also reducing the load on decoding.

Figure 3:
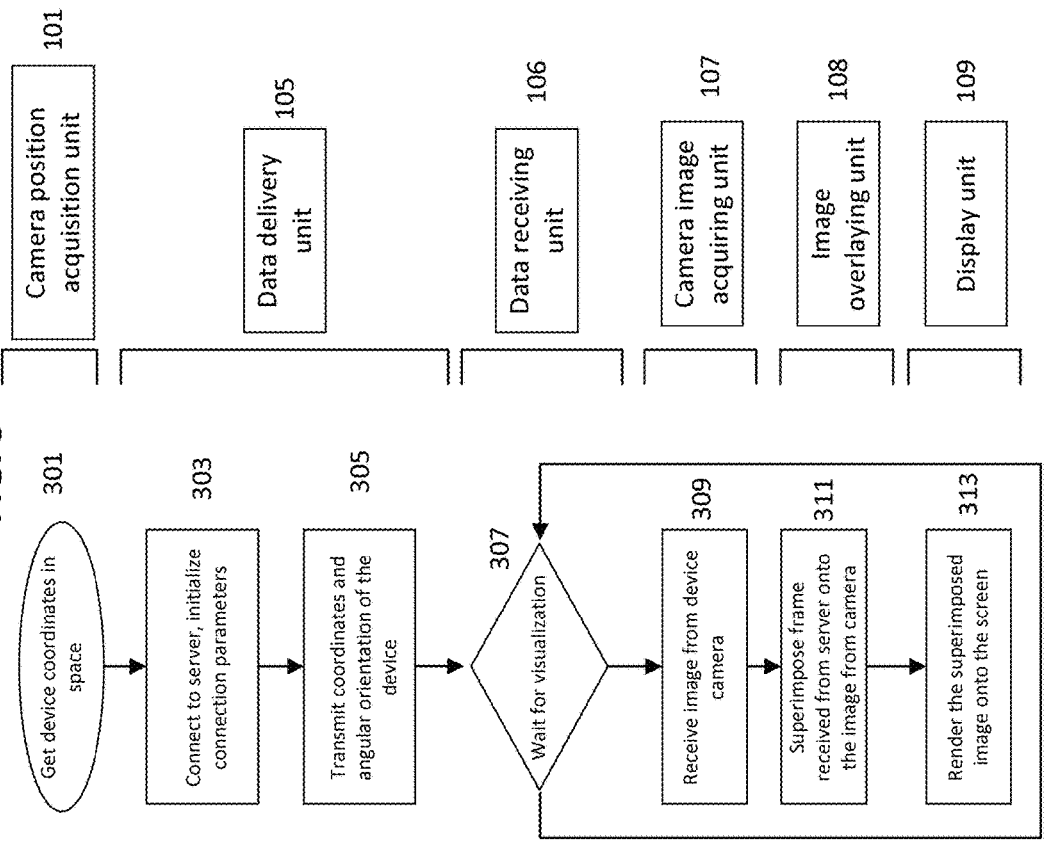
FIG. 3 illustrates the algorithm on the client side.

FIG. 3 illustrates the algorithm on the client 130 side. In step 301, the device initializes the coordinate space of the augmented reality, centered at the point that was targeted by the device camera when the application was launched. In step 303, the client device connects to the server and makes a request to start a streaming session. Then, it sends its parameters (as listed in step 201) to the server. In step 305, over fixed periods of time, the client device sends its coordinates, as well as rotation angle and projection of the camera to the server.

In step 307, the device waits for the next frame provided by its camera. In step 309, the device acquires frames from the camera in a texture format. In step 311, the device acquires frame containing rendered 3D objects in a scene from the server in a suitable video format, such as h264 or similar. In step 313, the device overlays its camera feed with AR images containing 3D objects using the alpha channel mask that is located in the right or bottom part of the image, depending on the selected mode. The resulting image is then displayed on the screen to the user.

Figure 4:
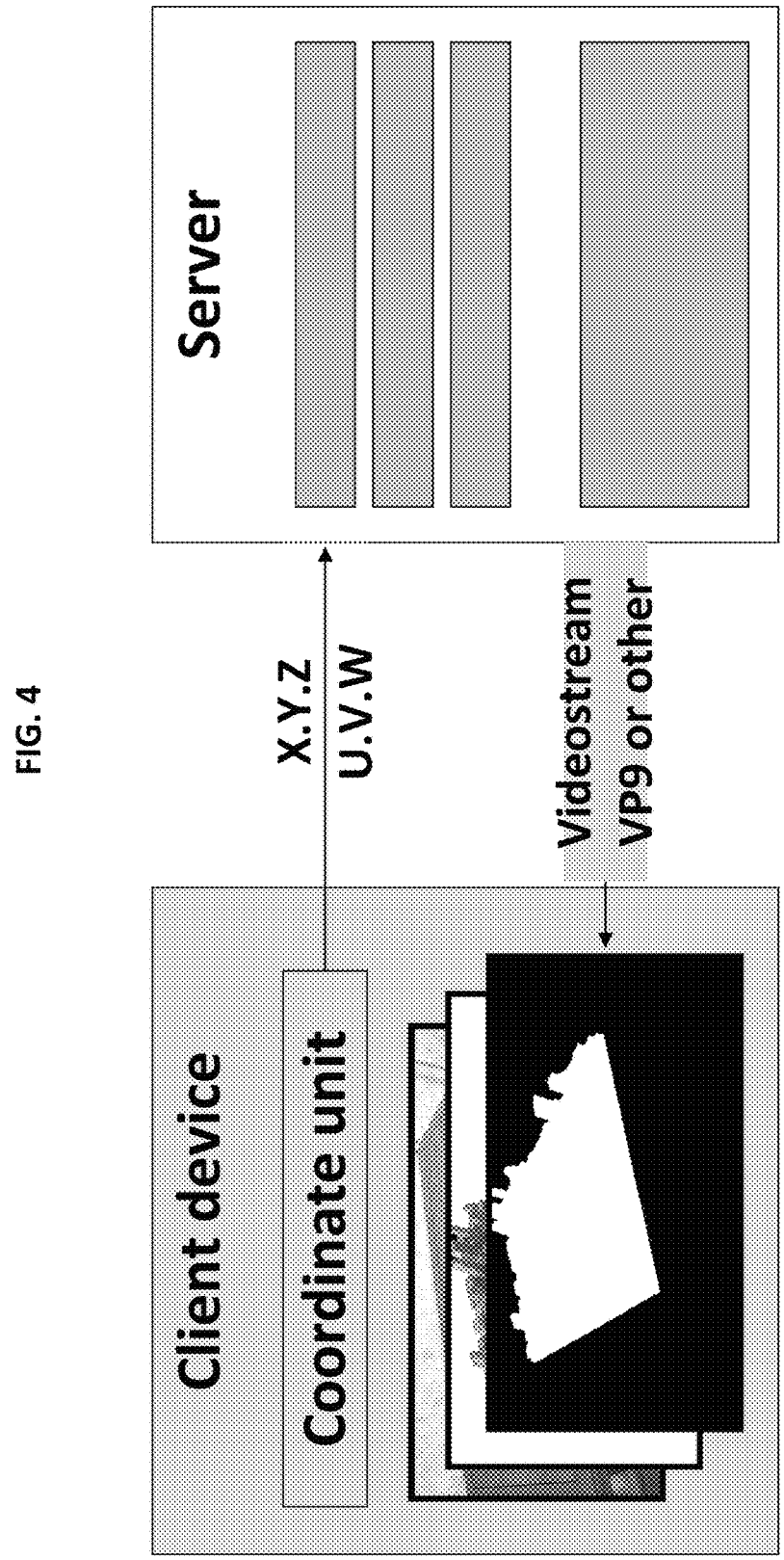
FIG. 4 illustrates the client-server connection and data exchange.

FIG. 4 illustrates the client-server connection and data exchange. This figure shows the diagram of interaction between the client device and server. The client device sends its coordinates that are then used by the server for rendering AR-based 3D graphics and sending them back to the client in a video stream format (e.g., *.h264). Upon receiving the video stream, the client overlays the device camera feed with the received 3D image based on the alpha channel mask, where white pixels are replaced with server-generated image parts and black pixels are replaced with camera feed image parts. This provides smoother transition and makes the image feel more complete. The resulting image is then displayed on the screen to the user.

The received video stream images have to be overlaid with alpha-channel masks to obtain frames with alpha channel (RGBA frames).

Figure 5:
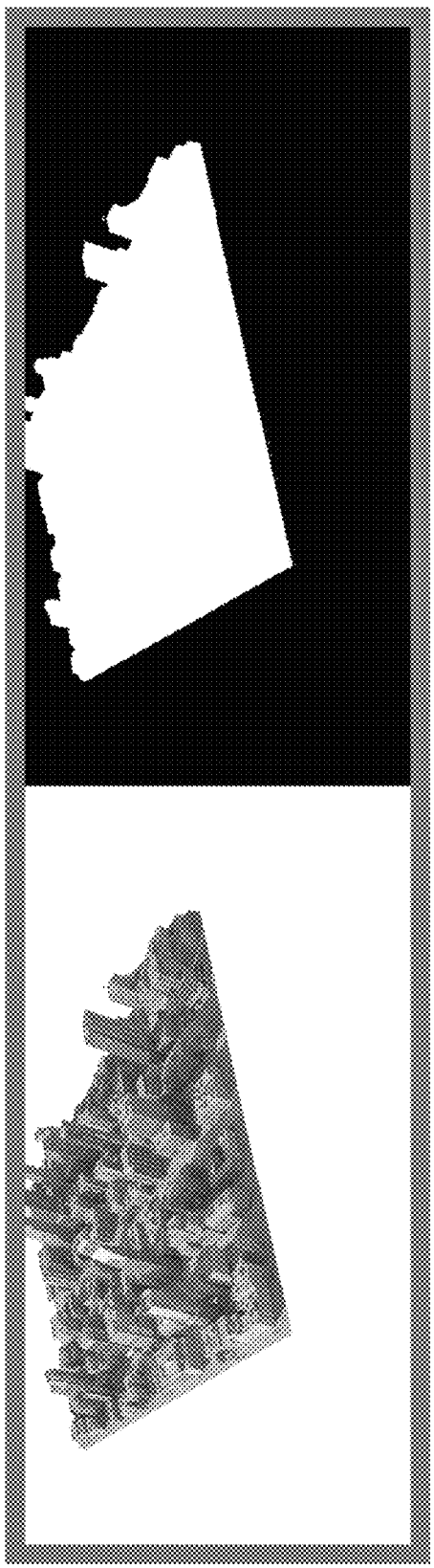
FIG. 5 shows a sample of a combined frame transmission format, using a codec that does not support an alpha channel.

FIG. 5 shows a sample of a combined frame transmission format. This figure illustrates one of the methods of separating the alpha channel from the current frame. According to this method, an alpha channel mask is created to the right of the image, the mask representing all pixels that correspond to 3D objects present in the frame. This method is used to overlay the camera feed with images containing 3D objects. This provides smoother transition and makes the image feel more complete.

Figure 6:
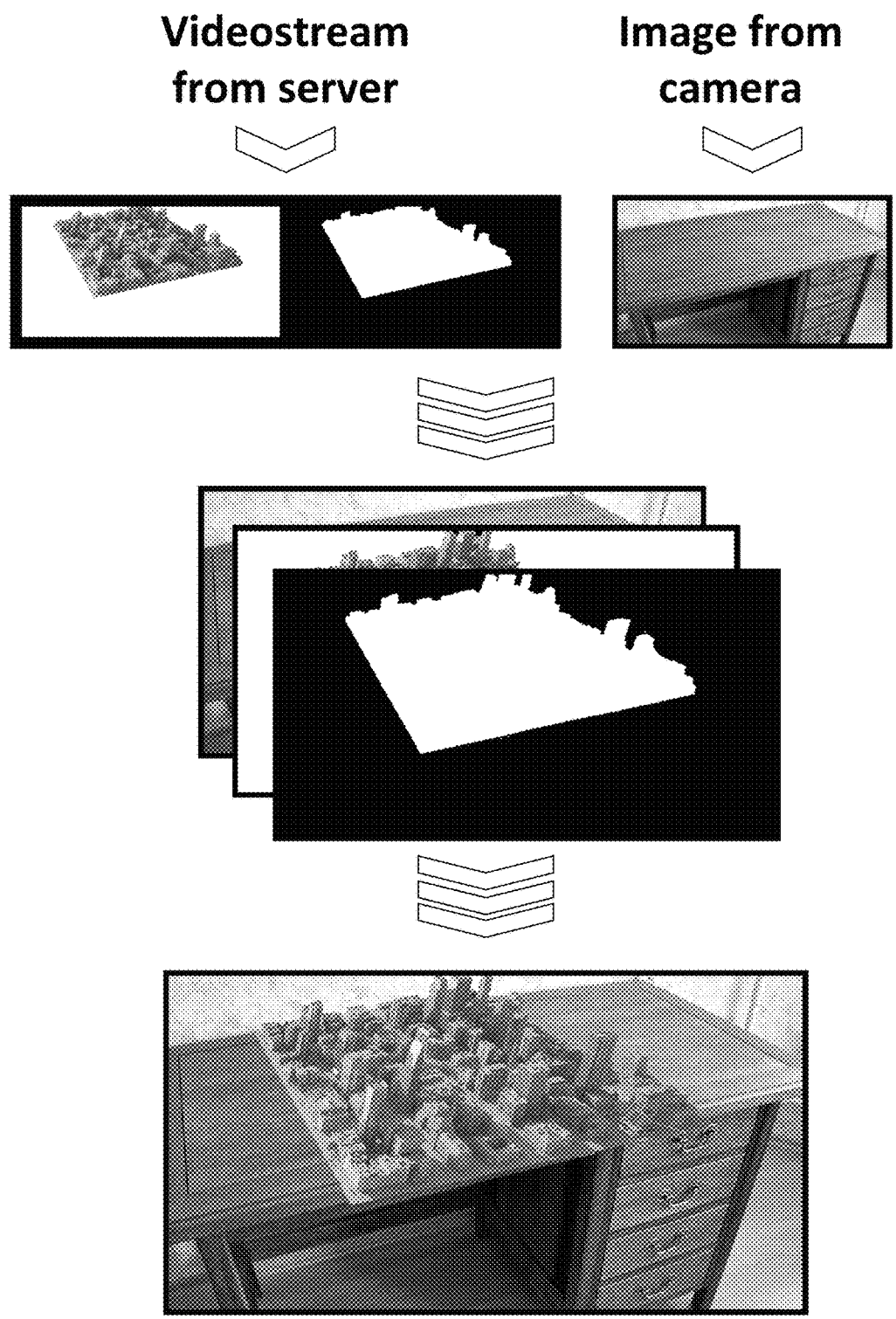
FIG. 6 shows an augmented reality-image overlaying the client's camera feed.

FIG. 6 shows an augmented reality-image overlaying the client's camera feed.

Figure 7:
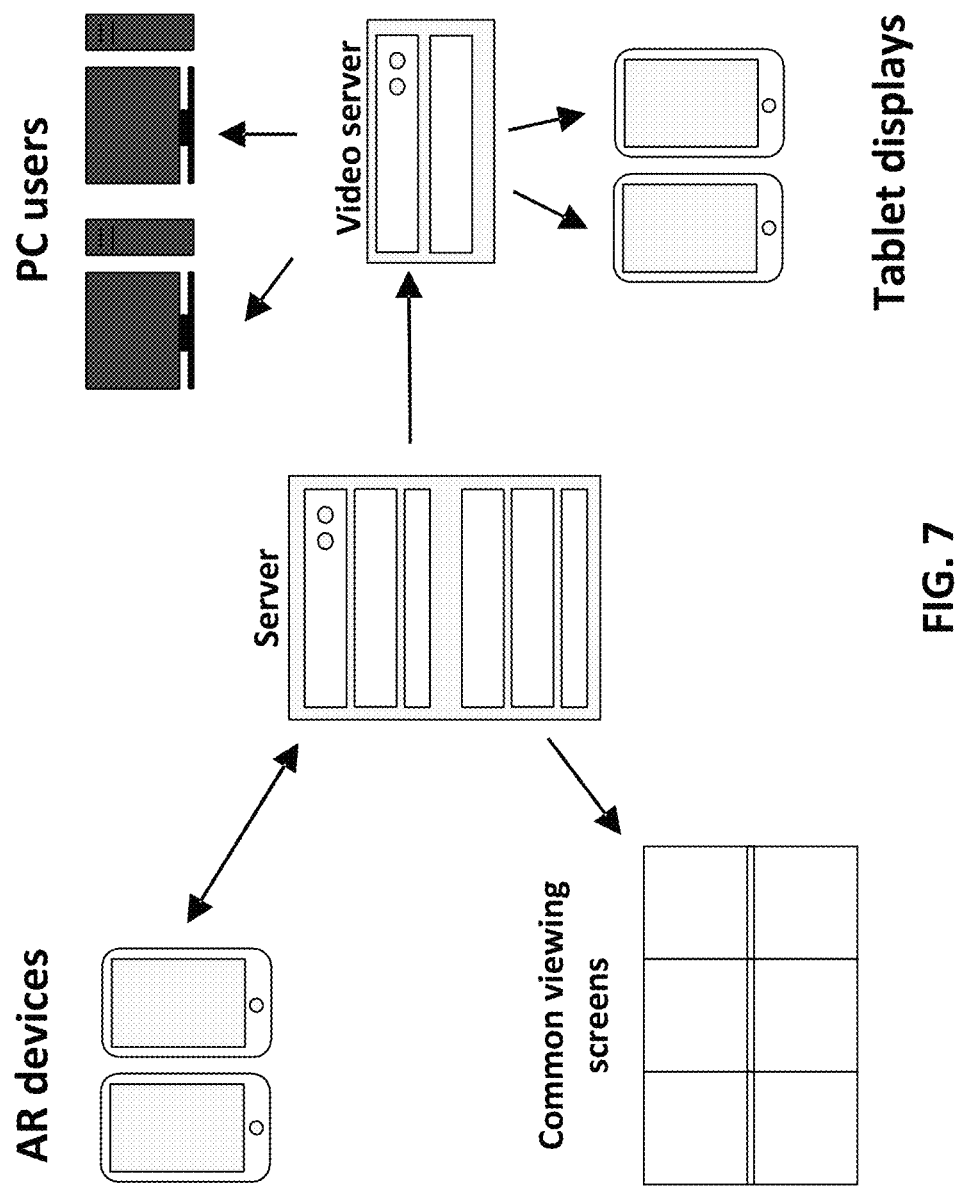
FIG. 7 shows an architecture of the network and methods of receiving AR content by users.

FIG. 7 shows a network function chart. In FIG. 7:

The augmented reality (AR) devices have the following functions:

1. Acquire the camera position in a virtual space data.
2. Transmit the current virtual position and orientation to the server.
3. Transmit images from the camera to the server as a video stream.
4. Acquire and display images on the screen as a video stream.

The initialization procedure for the AR device is as follows:

1. Determining of location in space based on environment or label recognition. The device coordinates also may be further refined by means of the GPS.
2. Connecting to the server 120 to send streams containing the camera position, camera images, commands for interaction with gaming objects, and to acquire images.

During initialization, as an AR device connects to the server 120, it also uses the network discovery procedure to facilitate user's interaction with the program. All control interactions, such as single or double screen taps, presses, swipes, etc. from the phone, are sent to the server 120 to be processed there.

An AR device supports the following transmission channels simultaneously:

1. A channel for transmitting the camera video stream (TCP or UDP connection, depending on broadcast quality/speed/stability requirements);
2. A UDP channel for sending the camera position data;
3. A TCP channel for transmitting interaction commands (it may be combined with the camera position channel, if a protocol allowing to differentiate between message types is developed);
4. A channel for receiving the video stream (TCP or UDP connection, depending on broadcast quality/speed/stability requirements);

The camera position is represented by two coordinate triples: position and tilt angles.

The server 120 has the following functions:

1. Rendering 3D scenes;
2. Receiving a video stream from the smartphone camera;
3. Processing interaction commands from the smartphone;
4. Overlaying the smartphone video stream with pre-rendered textures, based on the camera position in the scene, as supplied by the smartphone;
5. Transmitting the resulting image as a video stream to the phone;
6. Sending the resulting image from the "main" device to the video server.

The video server has the following functions:

1. Receives a video stream containing the 3D scene from the server;

2. Broadcasts the video to remote clients on demand.

Other options for implementing the inventive method and system include:

1. Parallel encoding of several video streams to allow the server to render frames for several devices simultaneously.

2. Optimization of video stream transmission over the UDP channel through determining of identical locations in the sequence of frames to send differing image parts only.

3. Operation stability and balanced load when a large number of devices is connected. This method requires the server bandwidth to be analyzed, along with the number of devices in the network and their screen resolutions, as it increases the traffic load. After the load has been analyzed the system may automatically redirect client's requests to a free server in order to balance the load among servers, in case the original server bandwidth is not enough or it does not have enough capacity to render 3D graphics for all connected devices.

4. Many video codecs exist today. The proposed concept assumes transmission of an alpha channel (the transparent channel). Not all video codecs support encoding with an alpha channel. If using a codec that does not support the alpha channel (such as .h264), the transparency mask transmission can be implemented by transmitting a separate video stream, "attached" to the main video stream. The resulting video stream would represent a doubled transmission for one of the sides (see FIG. 5).

The proposed approach allows the client device to display realistic augmented reality graphics regardless of the device performance and without straining its computational power. Thanks to the proposed approach, performance requirements for displaying 3D graphics are significantly reduced, thus enabling practically any device to support augmented reality graphics. The proposed approach enables:

Transmission of alpha channel data through video format (e.g., *.h264) by combining them with original frames using the GPU for better performance.

Support for rendering of translucent objects into a video stream.

Methods for matching the AR-hosting client device coordinates with the server data.

Product applications include streaming that can be used in all AR-related implementations. Server-based rendering will improve the AR-content quality, thus also enhancing perception and compelling users to view and interact with such content.

Fields of application include:
1. Trade malls
2. Hotels
3. Exhibitions
4. Concert events
5. Entertainment and social projects Use cases include:

1. Interactive showcases, where mannequins and static installations are replaced with "real" people in dynamic environments, and the user is able to interact with their contents.

2. Interior decorations that can be customized in accordance with current or upcoming events, such as Christmas, New Year, Halloween, sales, etc.

3. Visitor information as an interesting way to tell customers about current discounts and special offers, or to draw their attention to a specific event or area.

4. Entertainment for children and adults.

5. Interactive exhibitions that don't require transportation, placement or security, which allows to hold exhibitions in several places simultaneously.

6. A novel art movement that has an unlimited creative potential.

Figure 8:
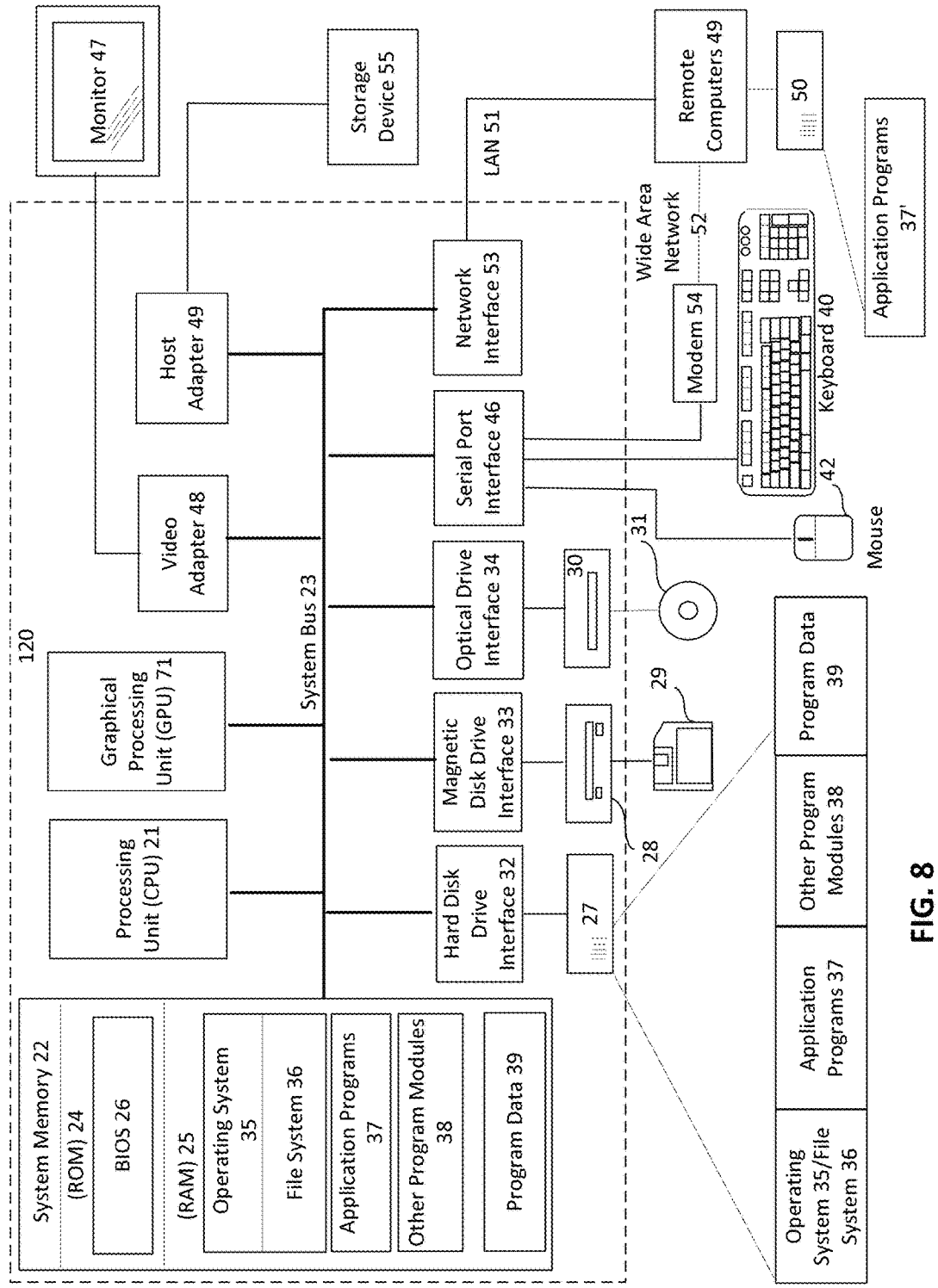
FIG. 8 illustrates an exemplary computer or server that can be used to implement the invention.

With reference to FIG. 8, an exemplary system for implementing the invention includes a general purpose computing device in the form of a host computer/node or a server 120 or the like, including a processing unit (CPU) 21, a graphical processing unit (GPU) 71, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the server or computer 120, such as during start-up, is stored in ROM 24.

The server 120 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 120. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The server 120 includes a file system 36 associated with or included within the operating system 35, such as the Windows NT™ File System (NTFS), one or more application programs 37, other program modules 38 and program data 39. A user may enter commands and information into the server 120 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 120 may operate in a networked environment using logical connections to one or more remote computers 49. The remote computer (or computers) 49 may be another personal computer, a server, a router, a network PC, a peer device or other common network node, and it typically includes some or all of the elements described above relative to the server 120, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 120 is connected to the local network 51 through a network interface or adapter 53. When used in a WAN networking environment, the server 120 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 120, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method of displaying augmented reality on a user device, the method comprising:
    initializing the user device, including launching a utility for determining device coordinates and device orientation;
    connecting to a server over a network;
    transmitting, to the server, user device parameters, the device coordinates and the device orientation;
    requesting from the server, or transmitting to the server, codec information for encoding received data from the server;
    transmitting, to the server, values of zero coordinates;
    continuously sending updated device coordinates and updated device orientation to the server;
    on the server, inserting virtual objects into a virtual scene that is maintained by the server, wherein the inserting uses the values of the zero coordinates and the updated device coordinates and updated device orientation,
    wherein the virtual scene includes a virtual camera that duplicates all movements of the camera of the user device;
    on the server, the virtual camera renders an image that includes the inserted virtual objects on a transparent background;
    encoding the image on the server;
    transmitting the encoded image to the user device;
    continuing the transmit encoded images based on updated virtual objects, the updated device coordinates and updated device orientation, as a video stream;
    on the user device, decoding the video stream;
    overlaying the video stream onto images generated by the camera of the user device to generate a combined video; and
    displaying the combined video on the user device.

2. The method of claim 1, wherein the user device parameters include screen resolution, operating system and data transmission protocol.

3. The method of claim 1, wherein the device coordinates, orientation and scale include a 4×4 matrix transform.

4. The method of claim 1, wherein the zero coordinates are determined by aiming a camera of the user device at a marker.

5. The method of claim 1, wherein the zero coordinates are determined by selecting any point on the display that shows an image from the camera of the user device.

6. The method of claim 1, wherein the zero coordinates are specified by the user.

7. The method of claim 1, wherein the encoding of the image on the server encodes the image with the alpha channel.

8. The method of claim 1, wherein the encoding includes encoding of rendered objects as a first channel, and encoding of a transparency mask as a second channel.

9. The method of claim 1, wherein the encoding includes encoding of rendered objects encoding of a transparency mask into a single channel, using a codec that supports an alpha channel.

10. A system for displaying augmented reality, the system comprising:
    a user device having a camera, a camera position acquisition unit, a camera image acquisition unit, a position and orientation determination unit, a data transmission unit, a data receiving unit, an image overlay unit, and a display;
    a server having an image generation unit;
    wherein, upon initialization, the user device launches a utility for determining device coordinates and device orientation using the position and orientation determination unit, and transmits values of zero coordinates to the server;
    wherein the user device transmits, to the server over the network, user device parameters, the device position and the device orientation;
    wherein the user device requests, from the server, codec information for decoding received data from the server;
    wherein the user device continuously sends updated device coordinates and updated device orientation to the server;
    wherein the server inserts virtual objects into a virtual scene that is maintained by the server, wherein the inserting uses the values of the zero coordinates and the updated device coordinates and updated device orientation,
    wherein the virtual scene includes a virtual camera that duplicates all movements of the camera of the user device;
    wherein the virtual camera renders an image that includes the inserted virtual objects on a transparent background;
    wherein the server encodes the image using the codec and transmits the encoded image to the user device;
    wherein the server continues transmitting encoded images based on updated virtual objects, the updated device coordinates and updated device orientation, as a video stream;
    wherein the data receiving unit decodes the video stream;
    wherein the image overlay unit overlays the video stream onto images generated by the camera of the user device to generate a combined video; and
    wherein the user device shows the combined video on the display.

11. The system of claim 10, wherein the user device parameters include screen resolution, operating system and data transmission protocol.

12. The system of claim 10, wherein the device coordinates, orientation and scale include a 4×4 matrix transform.

13. The system of claim 10, wherein the zero coordinates are determined by aiming a camera of the user device at a marker.

14. The system of claim 10, wherein the zero coordinates are determined by selecting any point on the display that shows an image from the camera of the user device.

15. The system of claim 10, wherein the zero coordinates are specified by the user.

16. The system of claim 10, wherein the encoding of the image on the server encodes the image with the alpha channel.

17. The system of claim 10, wherein the encoding includes encoding of rendered objects as a first channel, and encoding of a transparency mask as a second channel.

18. The system of claim 10, wherein the encoding includes encoding of rendered objects encoding of a transparency mask into a single channel, using a codec that supports an alpha channel.

\* \* \* \* \*